(No Model.)
H. C. SPALDING.
ANTI INDUCTION CABLE.
No. 327,489. Patented Sept. 29, 1885.
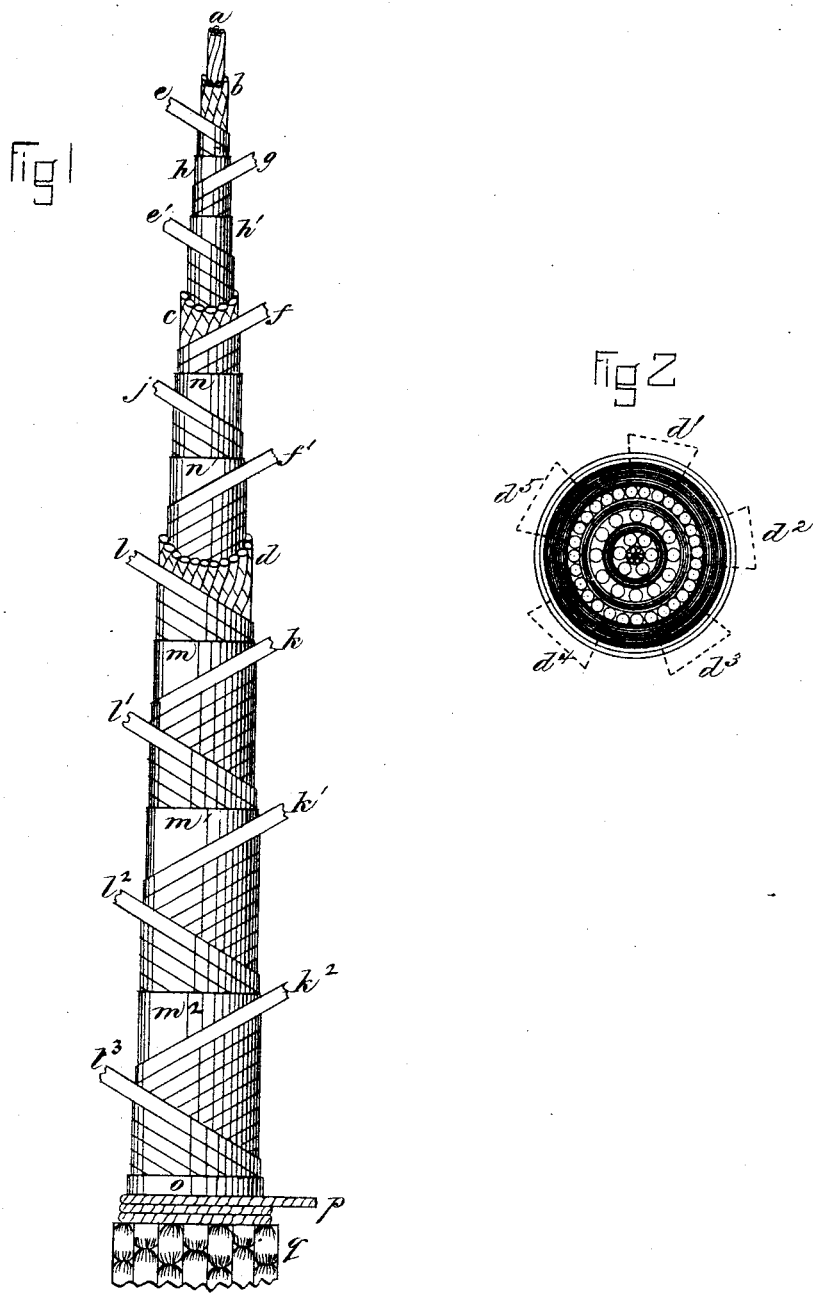
WITNESSES
W. Frisby
W. H. Doggett.
INVENTOR
Henry C. Spalding
By Parker W. Page
atty.

United States Patent Office.

HENRY C. SPALDING, OF BOSTON, MASSACHUSETTS.

ANTI-INDUCTION CABLE.

SPECIFICATION forming part of Letters Patent No. 327,489, dated September 29, 1885.

Application filed March 29, 1884. Renewed February 23, 1885. (No model.)

*To all whom it may concern:*

Be it known that I, HENRY C. SPALDING, a citizen of the United States, residing at Boston, in the county of Suffolk and State of Massachusetts, have invented certain new and useful Improvements in Anti-Induction Cables, of which the following is a specification, reference being had to the drawings accompanying and forming a part of the same.

My present invention relates to electrical cables designed for either submarine or subterranean use, and containing a number of independently-insulated conductors which form separate electrical circuits. The main objects of my invention are to confine in small compass a multiplicity of conductors in such manner that induction between the several circuits will be obliterated and electrical retardation prevented.

In other applications I have shown and described a plan for accomplishing this, which consists in surrounding one or more round wire circuits by one or more insulated metallic sheaths.

In the cable which forms the subject of this application I have taken advantage of this principle, applying it under certain novel conditions which the improved construction of the cable requires.

My invention, stated in general terms, consists in building upon a central core a cable containing one or more layers of insulated wires separated from each other by insulated metallic layers or screens and inclosed in one or more insulated screens.

The several features of novelty which this involves, together with certain other features adopted by me in the construction of the cable, will be described in detail in subsequent portions of this specification.

Figure 1 shows a cable constructed in accordance with my invention with portions of each layer or coat exposed. Fig. 2 is a cross-section of the cable drawn in a manner to illustrate the arrangement of circuits.

I employ a central core, $a$, of twisted iron or steel wires, though this may be dispensed with if great tensile strength is not imperative.

Around the core $a$, I lay a number of independently-insulated wires—say, six. These wires I prefer to insulate by coating them, first with a resinous varnish, and then winding around them spirally a strip of thin Manila paper. If a very thin coating be used for insulating these wires, it will be advisable to use other insulating material between it and the core $a$.

Over the wires $b$, I then wind a strip of paper, $e$, either directly or upon a coating of a plastic material, such as I have described in other applications. On the paper $e$ is laid a coat of resinous varnish, $h$. On this is wound a layer of tin-foil, $g$, which is itself coated with varnish $h'$, and then covered with a spirally-wound layer of paper, $e'$. On the paper a layer of insulated wires, $c$, similar to those designated $b$, is spirally laid. The number of wires in this layer will be, for instance, twelve. The spaces between these wires, if such exist, as shown in Fig. 2, may be filled in with a plastic insulating material. A strip of paper, $f$, is then wound around them. Then follow a coating, $n$, of resinous varnish, a layer of spirally-wound metal foil, $j$, a coat of varnish, $n'$, and a layer of paper, $f'$.

Upon the latter is laid another layer of insulated wires, $d$, thirty, in the present case, in number. Next to these wires is a layer of paper, $l$, then a coating of varnish, $m$, and then come, in the order designated, the three layers composed of the spirally-wound metal strips $k$ $k'$ $k^2$, the layers composed of the paper strips $l'$ $l^2$ $l^3$, and the intermediate coats of varnish, $m'$ and $m^2$. Over the last layer, $l^3$, of paper is applied a thick coating, $o$, of a permanently viscous insulating compound, such as one of bitumen and boiled linseed-oil. Into this is wound a serving of twine, $p$, and this latter is covered with the protective armor or braided jacket $q$.

In the cable which I have now described the insulated conductors are separated from each other by insulated metallic screens and inclosed in turn by similar screens which intervene between all the conductors and the ground. By being applied in layers, as described, great saving of space is effected and the strength, compactness, and flexibility of the cable greatly increased. This is also brought about in great measure by the materials entering into the composition of the cable and by the manner in which the same are applied. I do not, however, confine myself to either the materials used nor the specified manner of applying them.

Another particular in which the construction of the cable may be varied is in the number and size of the insulated conductors used. The inner wires, $b$, may constitute the core, or they may be laid round a core. In the latter event they should be of such number as to make a round core for the subsequent layers. This is also true of the other layers, $c$ and $d$. The diameter of the wires of each layer may increase or diminish in proportion to their distance from the center, and when very small wires are used several may be utilized in lieu of one larger.

In working the cable the wires are to be used for both the leading and return conductors of circuits, and between each pair of wires so used there should be an idle wire to act as a screen to shut off induction. For example, in the present instance, six wires being wound around the core, four will be used as complete or round-wire circuits, and two as idle wires. In the next layer, in which twelve wires occur, there are four complete circuits and four idle wires. In the outer layer of thirty wires the idle wires are designated by the dotted lines $d'\ d^2\ d^3\ d^4\ d^5$. The pairs of wires between these are those that are connected in operative circuits. By this arrangement all inductive effects are destroyed, and by the interposition of the insulated screens between the layers of wire, and between the layers of wire and the ground, retardation is prevented. The layers or screens of metal between the wires and ground may be more or less in number than three, and in lieu of single screens between the wires more may obviously be used.

Having now described the best manner of which I am aware in which my invention is or may be carried into effect, what I claim is—

1. In an electrical cable, the combination of two or more groups or layers of independently-insulated conductors, with interposed and inclosing insulated metallic screens, as set forth.

2. In an electrical cable, the combination of two or more groups or layers of insulated conductors forming or adapted to form complete or round-wire circuits, with interposed and inclosing insulated metallic screens, as and for the purpose specified.

3. In an electrical cable, two or more groups or layers of insulated wires, forming complete or round-wire circuits, with idle wires between the wires of each circuit, in combination with insulated metallic screens or sheaths interposed between and surrounding the said groups of conductors, in substantially the manner specified.

4. In an electrical cable, the combination of a central supporting-core, a series of insulated conductors adapted to form complete circuits laid thereon, an insulated metallic screen or layer surrounding the conductors, a surrounding layer or layers of insulated conductors adapted to a similar purpose, and an external insulation, all as set forth.

5. In an electrical cable, the combination of a central supporting-core, two or more groups or layers of insulated conductors, anti-induction and insulating layers separating said groups or layers, and insulated metallic screens inclosing the same, all as set forth.

In testimony whereof I have hereunto set my hand this 27th day of March, 1884.

HENRY C. SPALDING.

Witnesses:
SANFORD H. DUDLEY,
E. BAKER WELCH.